United States Patent
Grant et al.

(10) Patent No.: US 8,070,464 B2
(45) Date of Patent: Dec. 6, 2011

(54) RETENTION SYSTEM

(75) Inventors: Marian B. Grant, Princeville, IL (US); Rahul H. Gramopadhye, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1053 days.

(21) Appl. No.: 11/809,608

(22) Filed: Jun. 1, 2007

(65) Prior Publication Data
US 2008/0296402 A1 Dec. 4, 2008

(51) Int. Cl.
*F04B 17/00* (2006.01)

(52) U.S. Cl. ............ 417/415; 417/572; 92/129; 92/256; 92/259

(58) Field of Classification Search .................. 417/470, 417/222.2, 319, 363, 415, 313, 471, 572; 74/569; 92/188, 256, 72, 200, 255, 257, 92/258, 259, 129; 234/89; 251/368, 337; 29/888.051; 123/509, 510; 137/462; 156/293; 403/257, 355, 356, 357, 358, 366, 369, 370, 403/371; 239/88
See application file for complete search history.

(56) References Cited

U.S. PATENT DOCUMENTS

| | | | | |
|---|---|---|---|---|
| 3,421,734 A | * | 1/1969 | Updike et al. ................. | 251/337 |
| 3,426,656 A | | 2/1969 | Bimba | |
| 3,457,842 A | | 7/1969 | Tennis | |
| 3,654,839 A | | 4/1972 | Thompson | |
| 4,075,987 A | * | 2/1978 | Tauschek et al. ............ | 123/90.3 |
| 4,355,546 A | | 10/1982 | Moloney et al. | |
| 4,538,558 A | * | 9/1985 | Updike et al. ............... | 123/90.3 |
| 4,770,137 A | * | 9/1988 | Okabe et al. ............... | 123/198 F |
| 4,815,360 A | * | 3/1989 | Winterle ........................ | 92/255 |
| 5,038,673 A | | 8/1991 | Schulze | |
| 5,154,532 A | * | 10/1992 | Schaefer et al. ............. | 403/301 |
| 5,279,211 A | | 1/1994 | Bentz et al. | |
| 5,327,814 A | | 7/1994 | Custer et al. | |
| 5,392,693 A | | 2/1995 | Engel et al. | |
| 5,435,234 A | | 7/1995 | Bentz et al. | |
| 5,524,592 A | * | 6/1996 | Woody et al. ................. | 123/510 |
| 5,727,507 A | * | 3/1998 | Johansson .................... | 123/90.3 |
| 5,758,985 A | | 6/1998 | Yuda | |
| 5,888,054 A | * | 3/1999 | Djordjevic .................... | 417/254 |
| 5,913,504 A | | 6/1999 | Nishimura et al. | |
| 5,979,297 A | * | 11/1999 | Ricco ............................. | 92/129 |

(Continued)

FOREIGN PATENT DOCUMENTS
EP 0543798 5/1993

(Continued)

*Primary Examiner* — Devon C Kramer
*Assistant Examiner* — Leonard J Weinstein
(74) *Attorney, Agent, or Firm* — Mat P. Anderson; Liell & McNeil (57) ABSTRACT

While ceramic materials possess properties that make them suitable for use in fuel system components, they tend to be susceptible to failure when exposed to tensile stresses. The retention system described herein helps to reduce the tensile stresses experienced by a retained member by providing a retained member with an engagement structure, a multi-piece retention ring that engages the engagement structure, a resilient member coupled to the retention ring, and a retainer coupled around at least a portion of the retention ring and resilient member and spaced apart from the retention ring and/or resilient member by a gap. The retained member, retention ring, resilient member, and retainer are configured so that the retention ring is moveable in an axial direction relative to the retained member and so that the movement of the retention ring acts to expand the resilient member against the bias provided by the resilient member.

22 Claims, 4 Drawing Sheets

U.S. PATENT DOCUMENTS

| | | |
|---|---|---|
| 6,149,073 A | 11/2000 | Hickey et al. |
| 6,209,798 B1 * | 4/2001 | Martin et al. ................ 239/88 |
| 6,260,471 B1 | 7/2001 | Tanaka et al. |
| 6,874,474 B2 | 4/2005 | Fuchs |
| 7,134,851 B2 * | 11/2006 | Chenoweth ................ 417/571 |

FOREIGN PATENT DOCUMENTS

WO　　WO 2006131999 A1 * 12/2006

* cited by examiner

RETENTION SYSTEM

TECHNICAL FIELD

The present disclosure relates generally to a system for retaining a first element relative to a second element or assembly. More particularly, the present disclosure relates to a system, assembly, and method for holding a ceramic plunger within a retention assembly in a high-pressure pump.

BACKGROUND

Ceramic materials generally possess several advantageous properties. For example, components or parts constructed from ceramic materials generally are very hard, have a relatively high resistance to wear, corrosion, thermal stress, and compressive stress, are generally nonconductive, and may possess other properties that are advantageous for particular applications. However, ceramic components and parts also tend to be brittle and are capable of withstanding only relatively small tensile stresses. Consequently, the use of ceramic parts has been primarily limited to applications where the ceramic part is subjected to little or no tensile loads.

While many different machines and devices could benefit from a part or component that is hard, that exhibits high resistance to wear, corrosion, thermal stress, and compressive stress, and that is nonconductive, ceramic has not been a feasible option for use in these machines and devices because of its relative inability to withstand tensile stresses. For example, in high-pressure fuel pumps, such as the fuel pumps used in common rail fuel injection systems to generate rail pressures up to and even beyond 190 MPa, the use of a plunger or piston that is hard, that has high resistance to wear, corrosion, thermal stress, and compressive stress, and that is nonconductive would be beneficial. However, manufacturers have had difficulty making use of ceramic plungers because the ceramic plungers are exposed to excessive tensile stresses which cause the plungers to prematurely fail.

Various retention assemblies that are used to hold a piston within a retainer assembly in a pump or within a rod in a hydraulic cylinder are known. One example of such a retention assembly is described in U.S. Pat. No. 3,654,839, issued Apr. 11, 1972 ("the '839 patent"). The retention assembly of the '839 patent includes a split retainer that has a rib that engages a grooved portion of a rod and a flange that engages a groove in a piston. A circumferentially interrupted band surrounds the split retainer and serves to hold the retainer in an operative condition prior to the insertion of the rod and piston assembly into a cylinder. The engagement of the rib with the groove in the rod and the engagement of the flange with the groove in the piston serve to retain the rod within the piston. Although the retention assembly described in the '839 patent represents a simple way to retain the rod within the piston, it may not be suitable for applications where it is important to minimize the tensile stress experienced by the member being retained (in this case, the rod) because the retention assembly serves to rigidly couple the piston to the rod and does not provide a stress reduction mechanism.

It would be advantageous to provide a relatively simple, reliable, durable, and inexpensive retention system that could effectively hold a ceramic element or plunger and at the same time reduce the magnitude of tensile stresses experienced by the plunger to extend the life of the plunger.

SUMMARY

According to one exemplary embodiment, a retention system comprises a first element, a retention ring, a resilient member, and a retainer. The first element has a longitudinal axis and may include an engagement structure. The retention ring may be divided into at least two pieces and may be located around at least a portion of the first element. At least a portion of the retention ring may engage the engagement structure of the first element. The resilient member may be coupled to the retention ring and may be configured to resiliently bias each of the at least two pieces of the retention ring toward the first member. The retainer may be coupled around at least a portion of the retention ring and at least a portion of the resilient member. The retainer may have an inner surface that is spaced apart from an outer surface of at least one of the retention ring and the resilient member by a gap. The first element, the retention ring, the resilient member, and the retainer may be configured so that the retention ring is moveable in an axial direction relative to the first element and so that the movement of the retention ring relative to the first element acts to expand the resilient member against the bias provided by the resilient member.

According to another exemplary embodiment, a method of retaining a first element within a second element comprises the steps of providing a first engagement structure on the first element and providing a second engagement structure on the second element. The second engagement structure may be configured to engage the first engagement surface and to move relative to the first engagement structure. The method also includes the step of providing a resilient member to store energy when the second engagement structure moves relative to the first engagement structure.

DETAILED DESCRIPTION

Figure 1:
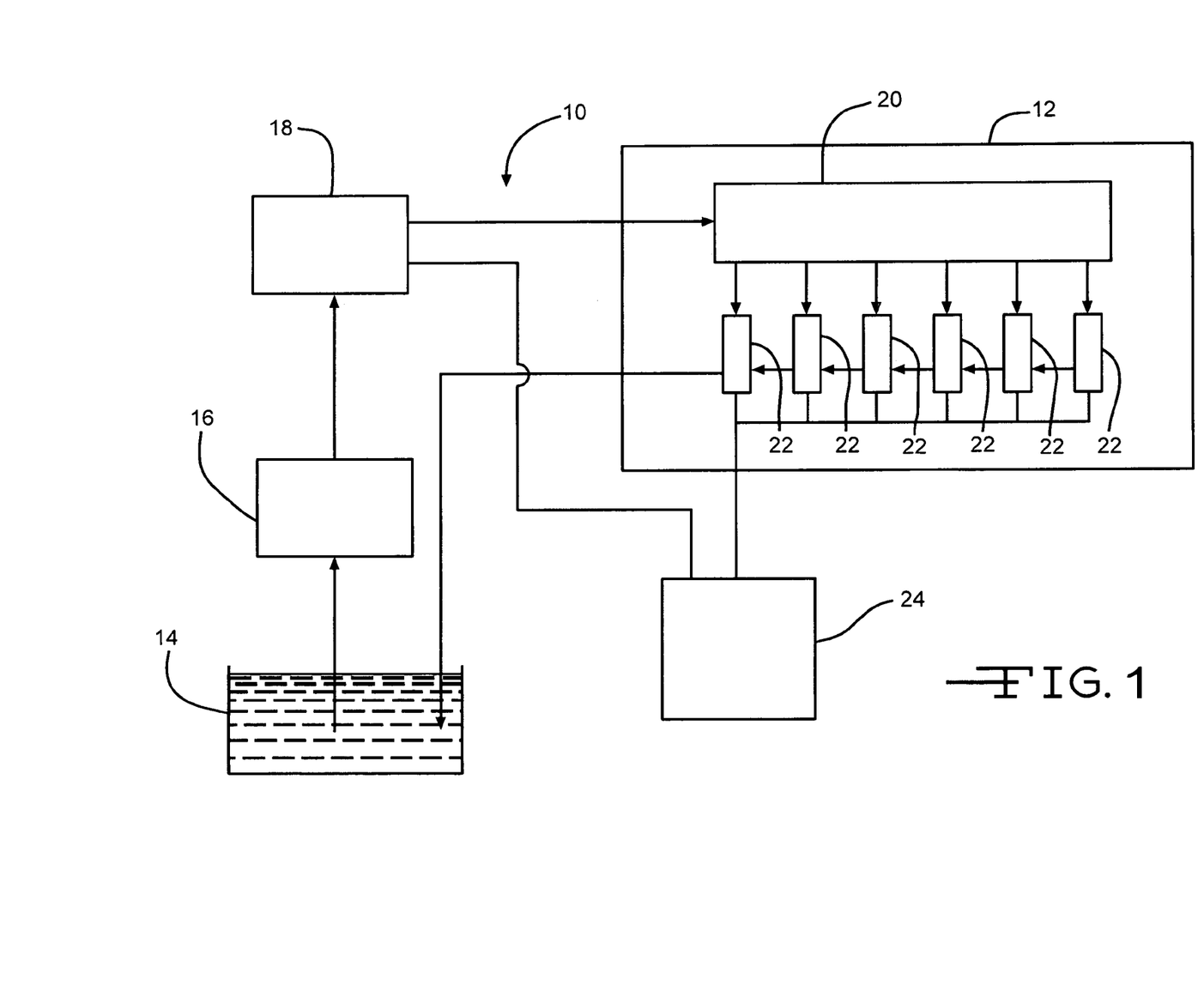
FIG. 1 is a schematic illustration of a fuel system according to one exemplary embodiment.

Referring generally to FIG. 1, a fuel system 10 is shown according to one exemplary embodiment. Fuel system 10 is a system of components that cooperate to deliver fuel (e.g., diesel, gasoline, heavy fuel, etc.) from a location where fuel is stored to the combustion chamber(s) of an engine 12 where it will combust and where the energy released by the combustion process will be captured by engine 12 and used to generate a mechanical source of power. Although depicted in FIG. 1 as a fuel system for a diesel engine, fuel system 10 may be the fuel system of any type of engine (e.g., an internal combustion engine such as a diesel or gasoline engine, a turbine, etc.). According to one exemplary embodiment, fuel system 10 includes a tank 14, a transfer pump 16, a high-pressure pump 18, a common rail 20, fuel injectors 22, and an electronic control module (ECM) 24.

Tank 14 is a storage container that stores the fuel that fuel system 10 will deliver. Transfer pump 16 pumps fuel from tank 14 and delivers it at a generally low pressure to high-pressure pump 18. High-pressure pump 18, in turn, pressurizes the fuel to a high pressure and delivers the fuel to common rail 20. Common rail 20, which is intended to be maintained at the high pressure generated by high-pressure pump 18, serves as the source of high-pressure fuel for each of fuel injectors 22. Fuel injectors 22 are located within engine 12 in a position that enables fuel injectors 22 to inject high-pressure fuel into the combustion chambers of engine 12 (or pre-chamber or ports upstream of the combustion chamber in some cases) and generally serve as metering devices that control when fuel is injected into the combustion chamber, how much fuel is injected, and the manner in which the fuel is injected (e.g., the angle of the injected fuel, the spray pattern, etc.). Each fuel injector 22 is continuously fed fuel from common rail 20 such that any fuel injected by a fuel injector 22 is quickly replaced by additional fuel supplied by common rail 20. ECM 24 is a control module that receives multiple input signals from sensors associated with various systems of engine 12 (including fuel system 10) and indicative of the operating conditions of those various systems (e.g., common rail fuel pressure, fuel temperature, throttle position, engine speed, etc.). ECM 24 uses those inputs to control, among other engine components, the operation of high-pressure pump 18 and each of fuel injectors 22. The purpose of fuel system 10 is to ensure that the fuel is constantly being fed to engine 12 in the appropriate amounts, at the right times, and in the right manner to support the operation of engine 12.

Figure 2:
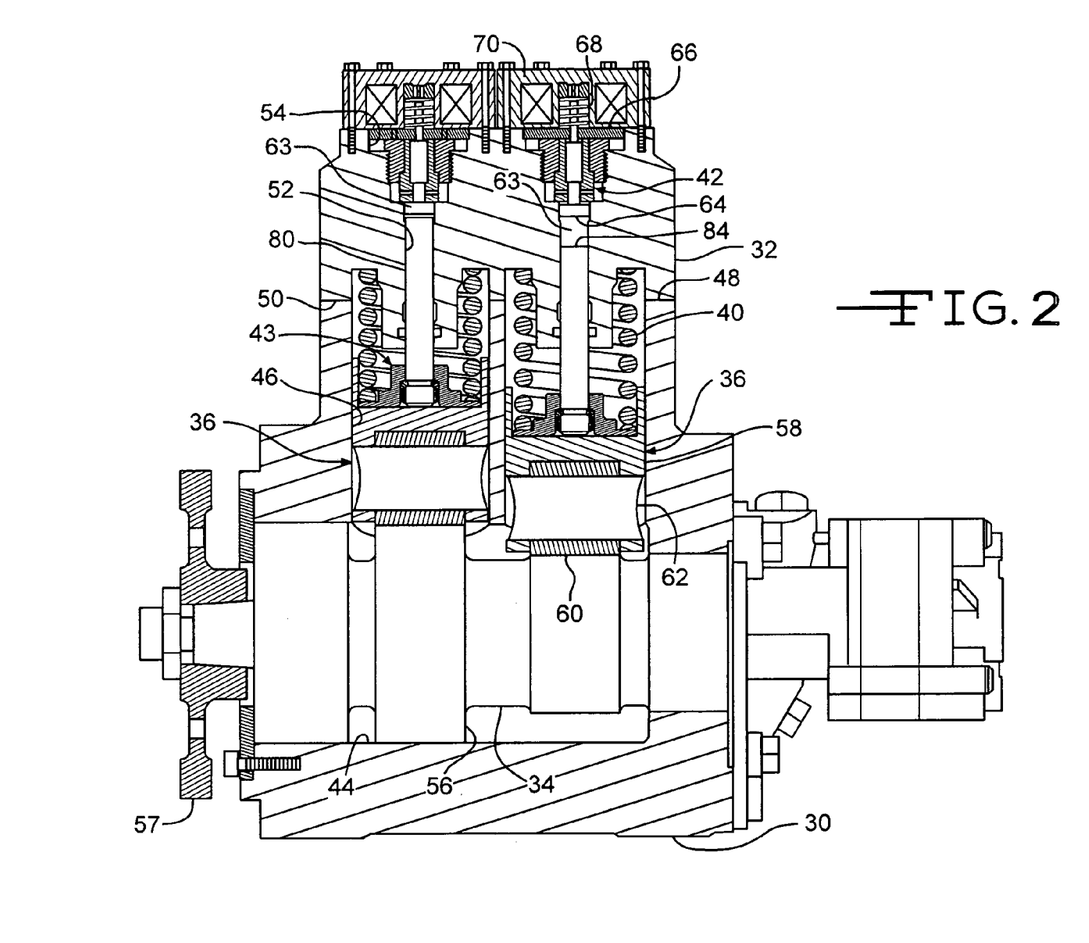
FIG. 2 is a cross-sectional side view of a pump including a plunger assembly according to one exemplary embodiment.

Referring now to FIG. 2, high-pressure pump 18 is configured to increase the pressure of the fuel from a pressure that is sufficient to transfer the fuel from the tank to a pressure that is desirable for the injection of the fuel into the combustion chambers of engine 12 (or injection elsewhere). Such injection pressures may vary between different applications, but often range between approximately 1500 bar and 2000 bar, and may include pressures that are below 1500 bar or above 2000 bar. According to one exemplary embodiment, pump 18 includes a housing 30, a head 32, a camshaft 34, two tappet assemblies 36, two resilient members 40, two control valve assemblies 42, and two plunger assemblies 43.

Housing 30 is a rigid structure that generally serves as the base of pump 18. Housing 30 includes a central bore 44 that is configured to receive camshaft 34, as well as two spaced-apart, parallel tappet bores 46 that are each configured to receive at least a portion of a tappet assembly 36, a plunger assembly 43, a resilient member 40, and head 32. The axis of each tappet bore 46 is arranged perpendicular to the axis of central bore 44 such that the rotation of camshaft 34 within central bore 44 causes tappet assemblies 36 to translate in a linear, reciprocating manner within tappet bores 46. Housing 30 also includes a face 48 at the distal ends of tappet bores 46 that is configured to receive head 32.

Head 32 is coupled to face 48 of housing 30 and generally serves, among other things, to enclose tappet bores 46, provide a portion of the structure defining pumping chambers 63 (discussed below), receive control valve assembly 42, and provide various ports and ducts to direct the flow of fuel into and out of pumping chambers 63. Head 32 includes a face 50 that cooperates with face 48 of housing 30 (and, optionally, a sealing element such as an o-ring) to provide a sealed interface between head 32 and housing 30. Head 32 also includes two plunger bores 52 (e.g., chambers, plunger chambers, pressurization chambers, etc.) that are each configured to receive a portion of the corresponding plunger assembly 43. In addition, at the end of each of the plunger bores 52 that is farthest from housing 30, head 32 includes an aperture 54 that is configured to receive a portion of control valve assembly 42.

Camshaft 34 is a driven member that is formed from an elongated shaft that includes two sets of cam lobes 56 that are spaced apart along the length of camshaft 34 and a gear 57 on one of its two ends. Gear 57 is a driven gear that is configured to engage another gear that is driven, either directly or indirectly, by engine 12. For example, gear 57 may be configured to engage a corresponding gear of a camshaft that actuates the intake and/or exhaust valves of engine 12. The two sets of cam lobes 56 are spaced along the length of camshaft 34 so as to correspond with each of the two tappet assemblies 36. According to various exemplary and alternative embodiments, each set of cam lobes 56 may include a single cam lobe, two cam lobes, three cam lobes, or more than three cam lobes, with each cam lobe representing a complete pumping and filling cycle. According to over various alternative and exemplary embodiments, the two sets of cam lobes may be in phase with one another (such that the cam lobes of the first cam lobe set will pass under head 32 at the same time as the corresponding cam lobes of the second cam lobe set) or they may be out of phase with one another (such that the cam lobes of the first cam lobe set will pass under head 32 at different times than the corresponding cam lobes of the second cam lobe set). According to various other alternative and exemplary embodiments, the extent to which the cam lobes of the first cam lobe set may out of phase relative to the cam lobes of the second cam lobe set may vary depending on the application of pump 18 and other factors.

Referring still to FIG. 2, each tappet assembly 36 (also sometimes referred to as a lifter assembly) is configured to engage one of the two sets of cam lobes 56, transform the rotational movement of the corresponding cam lobes 56 into linear movement, and transfer such linear movement to the corresponding plunger assembly 43. Each tappet assembly 36 includes a body 58 that engages and receives a portion of plunger assembly 43, a roller 60 that engages and follows a set of cam lobes 56, and a pin 62 that couples roller 60 to body 58. Body 58 is received within the corresponding tappet bore 46 of housing 30 and translates back and forth within tappet bore 46 as camshaft 34 rotates.

Resilient member 40, shown as a compression spring, is an element or apparatus that serves to bias the corresponding plunger assembly 43 and tappet assembly 36 toward camshaft 34. By biasing both the corresponding plunger assembly 43 and tappet assembly 36 toward camshaft 34, resilient member 40 helps to ensure that plunger assembly 43 returns to its lowest position (hereinafter referred to as "bottom dead center") before camshaft 34 completes another rotation (or partial rotation) and forces plunger assembly 43 back up to its highest position (hereinafter referred to as "top dead center"). This helps to ensure that plunger assembly 43 is performing a complete filling cycle (the cycle where plunger assembly 43 moves from top dead center to bottom dead center) and a complete pumping cycle (the cycle where plunger assembly 43 moves from bottom dead center to top dead center) for each cam lobe 56 in the corresponding cam lobe set of camshaft 34.

Control valve assembly 42 generally serves to control the fluid communication between the fuel being provided by transfer pump 16 (a low pressure fuel source and part of a low pressure fuel system) and pumping chamber 63 (discussed below), and therefore is capable of controlling the amount of fuel that enters pumping chamber 63 during the filling cycle and the amount of fuel that is discharged back into the low pressure fuel system during the pumping cycle. Control valve assembly 42 includes a valve element 64, an armature 66 coupled to the valve element, a biasing member 68, and a solenoid 70. Valve element 64 is moveable between on open position in which the fuel inlet (e.g., low pressure fuel system) is fluidly connected to pumping chamber 63 and a closed position in which the fuel inlet is not fluidly connected to pumping chamber 63. Armature 66 and solenoid 70 cooperate with one another such that the activation of solenoid causes armature 66 to move toward solenoid 70. Because armature 66 is coupled to valve element 64, the movement of armature 66 toward solenoid 70 causes valve element 64 to move to the closed position. Biasing member 68, shown as a compression spring, urges armature 66 away from solenoid 70 and therefore urges valve element 64 toward the open position when solenoid 70 is deactivated.

Figure 3:
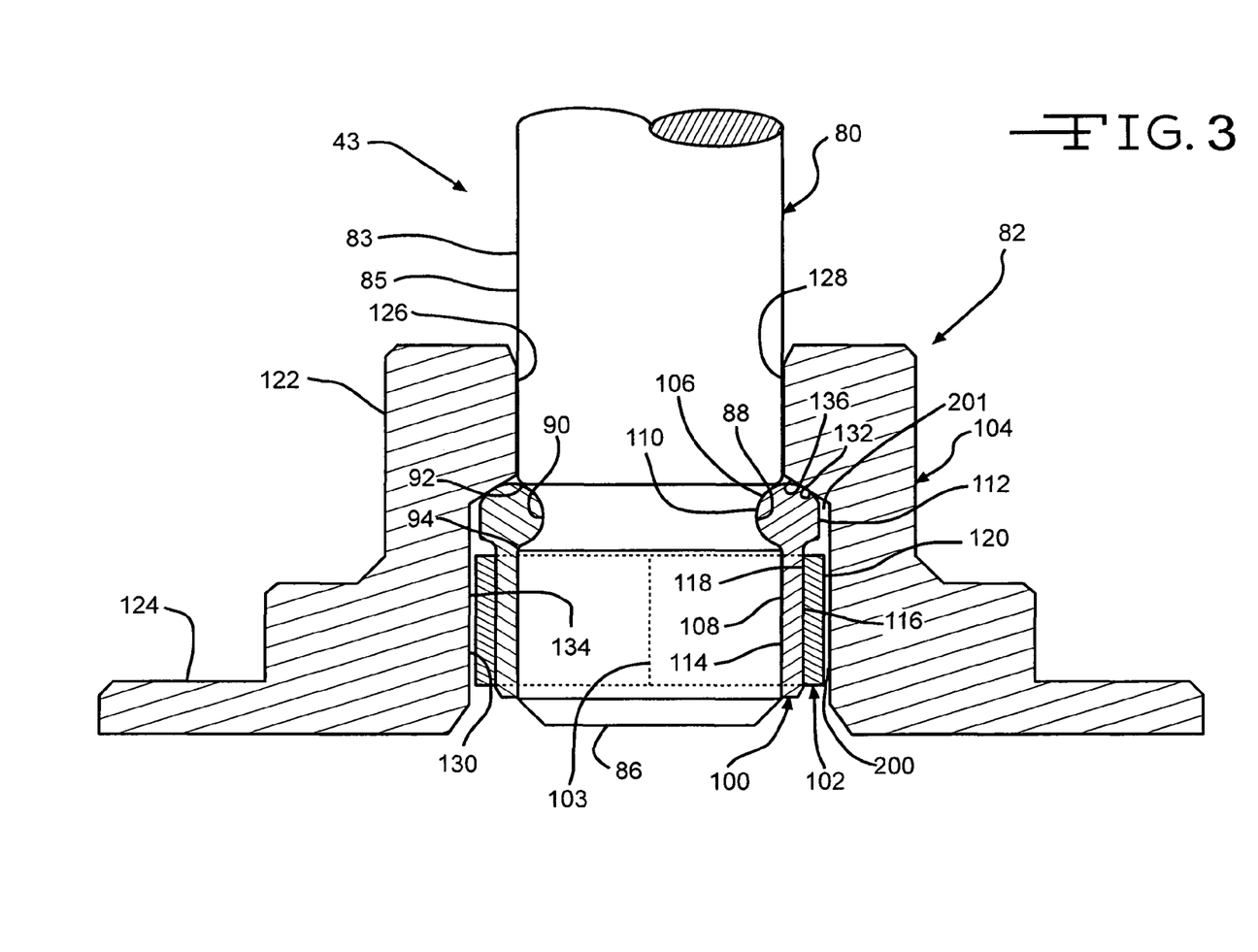
FIG. 3 is a cross-sectional side view of the plunger assembly of FIG. 2 illustrating a retention ring of the plunger assembly in a first engaged position with a plunger.
Figure 4:
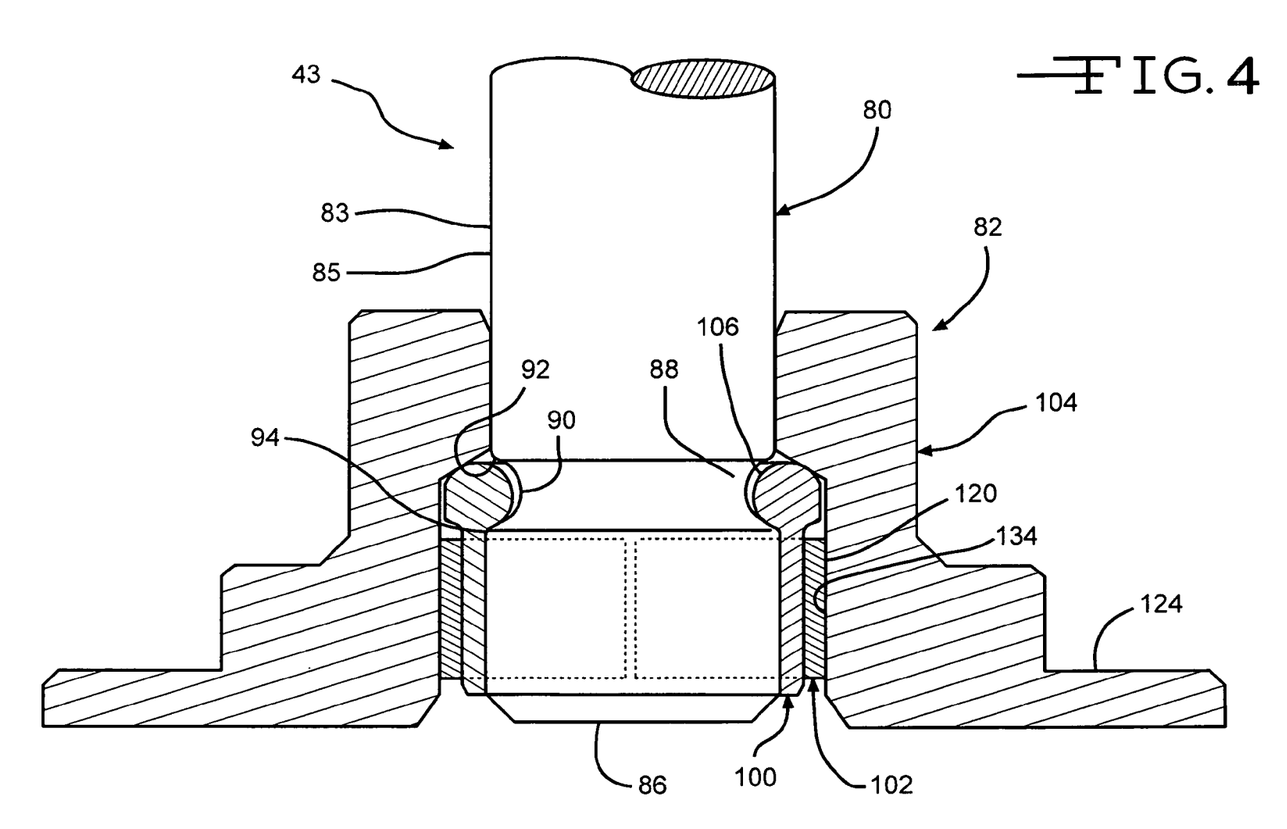
FIG. 4 is a cross-sectional side view of the plunger assembly of FIG. 3 illustrating the retention ring in a second engaged position with the plunger.

Referring now to FIGS. 2, 3, and 4, each of the two plunger assemblies 43 is an assembly of components that is located generally between the corresponding tappet assembly 36 and head 32 and that reciprocate with tappet assembly 36 relative to head 32 to pressurize the fluid within pumping chamber 63. According to one exemplary embodiment, plunger assembly 43 includes a plunger 80 and a retention assembly 82.

Plunger 80 is a member (e.g., piston, shaft, rod, element, retained member) that is configured to reciprocate or slide within plunger bore 52 of head 32 as the corresponding tappet assembly 36 reciprocates within tappet bore 46 of housing 30. According to one exemplary embodiment, plunger 80 includes an elongated, generally cylindrical body 83 having a side wall 85, a first end 84 that is configured to extend into plunger bore 52, and a second end 86 located near tappet assembly 36. Each of the first end 84 and second end 86 may be tapered or radiused to facilitate pump operation and/or assembly. First end 84, plunger bore 52, and a portion of control valve assembly 42 define pumping chamber 63, the volume of which changes as plunger 80 moves back and forth, or up and down, within plunger bore 52. Body 83 also includes an engagement structure shown as an annular groove 88 proximate second end 86 that is configured to receive a portion of retention assembly 82. According to one exemplary embodiment, engagement structure or groove 88 includes a main portion 90 having a generally semi-circular cross-sectional profile and two ends 92 and 94 that form a gradual (e.g., radiused or tapered) transition between main portion 90 and sidewall 85 of body 83. Stated differently, main portion 90 of groove 88 is a concave, curved region whereas each of ends 92 and 94 of groove 88 forms a generally convex and/or substantially flat, transition region. The design of groove 88 is intended to allow the portion of retention assembly 82 received within groove 88 to have the ability to move within groove 88 in an axial direction relative to body 83, but only if the retention assembly 82 also moves in a radially outward direction. Although the engagement structure may take any one of a variety of different shapes that force retention assembly 82 to move radially outward as it moves in at least one axial direction relative to plunger 80, the generally semi-circular groove 88 described above is beneficial (as other groove shapes may be) in that it helps to reduce stress concentrations in the area of groove 88. According to various alternative and exemplary embodiments, the groove may be provided around the entire circumference of body 83 or may extend over one or more portions or segments of the circumference. According to other various alternative and exemplary embodiments, the ends of the groove may be configured such that only one of the ends forms a transition region so that the retention assembly may only move in one axial direction within the groove. According to still other alternative and exemplary embodiments the engagement member may be a channel, a bead, a flange, an indentation, a projection, a bump, or other suitable structure that cooperates with a corresponding engagement structure provided on the retention ring.

According to various exemplary and alternative embodiments, plunger 80 may be made from one or more of a variety of different ceramic materials, such as carbides, pure oxides, nitrides, non-silicate glasses and others. For example, according to one exemplary embodiment, plunger 80 may be made from zirconia ($ZrO_2$). According to other alternative embodiments, plunger 80 may be made from one or more of alumina ($Al_2O_3$), calcia (CaO), silicon carbide (SiC), and silicon nitride ($Si_3N_4$). According to other various alternative and exemplary embodiments, the plunger may be made from any one of a variety of different materials that are suitable for the application in which the plunger will be used. Such materials may include one or more of various metals, alloys, irons, steels, composites, polymers, elastomers, or any other suitable materials.

Retention assembly 82 is an assembly of components that couple to plunger 80 and that serve to apply at least a portion of the force provided by resilient member 40 to plunger 80. According to one exemplary embodiment, retention assembly 82 includes a retention ring 100, a resilient member 102, and a retainer 104.

According to one exemplary embodiment, retention ring 100 is a generally ring-shaped member that is configured to substantially surround and engage groove 88 of plunger 80. Retention ring 100 is shown as being diametrically divided into two symmetrical pieces or halves. However, according to various alternative embodiments, the retention ring may be divided into three, four, five, or more than five pieces that cooperate to substantially surround groove 88. Retention ring 100 includes an engagement structure shown as a projection in the form of a ring-shaped bead 106 having a substantially circular cross-sectional shape and also includes a tube-like skirt 108 having a substantially rectangular cross-sectional shape and extending from engagement structure or bead 106 in an axial direction. Bead 106 includes a convexly curved inner surface 110 that is configured to engage groove 88 of plunger 80 and an outer surface 112 that may be configured to engage or contact a portion of retainer 104. The curved profile of inner surface 110 is substantially semi-circular and closely corresponds to the curved profile of groove 88. Skirt 108 includes an inner surface 114 that is configured to be located adjacent the portion of sidewall 85 of plunger 80 that is between groove 88 and end 86 of plunger 80. Skirt 108 also includes an outer surface 116 that is configured to be adjacent to, and substantially surrounded by, resilient member 102. As shown in FIGS. 3 and 4, the cylindrical skirt 108 has an axial length that is greater than the radially inward extending annular bead 106. According to one exemplary embodiment, each half or piece of retention ring 100 may be formed through a stamping process from a suitable metal. According to other various alternative and exemplary embodiments, the retention ring may be formed as single piece and then cut or split into the appropriate number of pieces. According to still other various alternative and exemplary embodiments, the retention ring or each half or piece of the retention ring may be machined or formed through any suitable manufacturing process from any one or more of a variety of different materials, including metals, steels, alloys, iron, ceramics, composites, or any other suitable material. According to still other alternative and exemplary embodiments the engagement member of the retention ring may be a channel, a bead, a flange, an indentation, a projection, a bump, or other suitable structure that cooperates with a corresponding engagement structure provided on the plunger.

Resilient member 102 is intended to act upon retention ring 100 to maintain the engagement of bead 106 of retention ring 100 with groove 88 of plunger 80 and is also intended to serve as a temporary energy storage device. According to one exemplary embodiment, resilient member 102 is a circular band of a resilient material (e.g., metal, spring steel, etc.) that includes a split 103 along the circumference of the band to provide two ends that move relative to one another when the diameter of the band is increased. For example, according to one exemplary embodiment, resilient member 102 may be similar to a "Corbin Clamp" that does not have tabs that facilitate the easy expansion of the clamp. According to another exemplary embodiment, resilient member 102 may be a strip of a resilient material that is formed into a circular band such that the two ends of the strip are located proximate one another and move apart from one another when the diameter of the band is increased. Resilient member 102 includes an inner surface 118 that is configured to be located adjacent skirt 108 of retention ring 100 and an outer surface 120 that is configured to be located near a corresponding portion of retainer 104. The resilient nature of resilient member 102 allows the two halves of retention ring 100 to move away from one another when acted upon by a force that overcomes the biasing force provided by resilient member 102. As the two halves of retention ring 100 move away from one another and overcome the biasing force provided resilient member 102, the diameter of resilient member 102 increases and energy is stored within resilient member 102. The resiliency of resilient member (e.g., the bias provided by the resilient member and the force required to expand the resilient member) may be tuned for a particular application by the selection of an appropriate material and/or by adjusting the design of the resilient member (e.g, such as by altering the thickness of the resilient member). According to one exemplary embodiment, resilient member 102 is formed through a stamping process from a suitable metal. According to various alternative and exemplary embodiments, resilient member may be machined or formed through any suitable manufacturing process from any one or more of a variety of different materials, including metals, steels, spring steels, alloys, composites, polymers, elastomers, or any other suitable materials.

Retainer 104 is an element that serves to receive resilient element 40 (e.g., spring) and ultimately transfer the force provided by resilient element 40 to plunger 80. According to one exemplary embodiment, retainer 104 includes a body portion 122 and a flange 124, one or both or which may be engaged by body 58 of tappet assembly 36. Body portion 122 includes a central aperture 126 that defines three concentric regions: a first region 128 in the upper portion of retainer 104, a second region 130 in the lower portion of retainer 104, and a transition region 132 located between first region 128 and second region 130. First region 128 has a diameter that is large enough to receive plunger 80, but not large enough to allow retention ring 100 to pass through. Second region 130, on the other hand, has a diameter that is large enough to receive both retention ring 100 and resilient member 102. More specifically, the diameter of second region 130 is large enough that there is a predetermined radial gap 200 between an inner surface 134 of second region 130 and outer surface 120 of resilient member 102, or alternatively, a predetermined radial gap 201 between inner surface 134 of second region 130 and outer surface 112 of bead 106. Radial gap 200 (or radial gap 201 as the case may be) provides a space that allows the pieces of retention ring 100 to move away from plunger 80 and that allows resilient member 102 to expand. However, the gap 200 (or gap G') is sized such that the pieces of retention ring 100 are not permitted to move far enough away from plunger 80 that bead 106 becomes disengaged with groove 88. Transition region 132, which is intended to serve as a contact surface for bead 106 of retention ring 100, is defined by a surface that extends between the surface defining first region 128 and inner surface 134 of second region 130. According to one exemplary embodiment, transition region 132 is defined by a generally flat surface that is oriented at about a 60 degree angle relative to a line that is parallel to the longitudinal axis of retainer 104. According to various alternative and exemplary embodiments, the transition region may be defined by a surface that is curved, radiused, tapered, flat, or by a surface having one or more portions that are curved, radiused, tapered, and/or flat. That particular configuration of transition region 132 may be determined based on the particular application in which plunger assembly 43 will be used, as the contact between transition region 132 and bead 106 and the component forces transferred thereby may need to be adjusted for different situations. Flange 124 of retainer 104 extends radially outward from body portion 122 and serves as the portion of retainer 104 that directly engages spring 40. According to one exemplary embodiment, retainer 104 is formed through a stamping process from a suitable metal. According to various alternative and exemplary embodiments, the retainer may be machined or formed through any suitable manufacturing process from any one or more of a variety of different materials, including metals, steels, alloys, iron, ceramics, composites, polymers, elastomers, or any other suitable material.

Although only one pump configuration was described above, it should be understood that the described pump is only one example of a pump in which the retention assembly may be used. For example, while only an inline plunger or piston pump was described above, the retention assembly could also be used within any one of a variety of different piston or plunger pump configurations (e.g., axial piston pump, radial piston pump, bent axis pump, inlet metered pump, outlet metered pump, etc.) and with any one of a variety of different fluids (e.g., fuel, oil, hydraulic fluid, etc.). It also should be understood that while pump 18 was described above as including two cylinders or pumping chambers 63, and consequently, two corresponding tappet assemblies 36, resilient members 40, control valve assemblies 42, and plunger assemblies 43, the pump could also be configured to include one, three, four, or more than four pumping chambers, depending on the particular application in which the pump is intended to be used.

INDUSTRIAL APPLICABILITY

Pump 18 operates to pressurize a fluid (e.g., fuel) by drawing fuel into one or more pumping chambers 63, reducing the size of pumping chambers 63, and then forcing the fuel through an outlet to common rail 20. The way in which pump 18 operates will now be more specifically described in connection with one of pumping chambers 63. Starting from the beginning of the pumping cycle, plunger 80 is at bottom dead center and pumping chamber 63, which is full of fuel, is at its maximum volume. As one of cam lobes 56 rotates to a position under tappet assembly 36, the cam lobe 56 forces tappet assembly 36, and therefore plunger assembly 43, upward. As plunger assembly 43 moves upward (according to the contour of cam lobe 56), plunger 80 moves upward within plunger bore 52 of head 32 thereby reducing the volume of pumping chamber 63. When plunger 80 begins to move upward, control valve assembly 42 is activated, closing off pumping chamber 63 from the fuel inlet. As plunger 80 continues to move upward, the volume of pumping chamber 63 continues to reduce, which forces fuel out of pumping chamber 63 to common rail 20. The pumping cycle continues until plunger 80 reaches top dead center, which occurs when the peak of cam lobe 56 is below tappet assembly 36. Once plunger 80 reaches top dead center, control valve assembly 42 is deactivated to allow inlet fuel from transfer pump 16 to enter pumping chamber 63. As the peak of cam lobe 56 rotates past tappet assembly 36, the bias provided by resilient element 40 urges plunger assembly 43 and tappet assembly 36 back down. At this point, the backside of cam lobe 56 is below tappet assembly 36, which allows it to move back down. As plunger 80 moves downward within plunger bore 52 during the filling cycle, fuel continues to fill pumping chamber 63. When plunger 80 reaches bottom dead center, pumping chamber 63 is full of fuel and is at its maximum volume. The cycle then starts over again, with the cam lobe 56 urging tappet assembly 36 and plunger assembly 43 back up toward top dead center. Control valve assembly 42 may be activated and deactivated at different times during the pumping and filling cycles to control how much fuel enters pumping chamber 63 during the filling cycle and to control whether pumping chamber 63 is coupled to the low pressure system (which acts like a drain) during all or a portion of the pumping cycle. In this way the output of the pump may be controlled.

In order to return each tappet assembly 36 and plunger assembly 43 pair to bottom dead center before lobes 56 on camshaft 34 initiate the next pumping stroke, resilient member 40 must apply a substantial force to tappet assembly 36 and plunger assembly 43. Over thousands of cycles, the repetitive application of a force by camshaft 34 against the bias of resilient member 40 to take plunger assembly 43 through the pumping cycle and then the release of the force provided by camshaft 34 in combination with the continued biasing force provided by resilient member 40 to take plunger assembly 43 through the filling cycle, is difficult for a ceramic plunger to withstand. Reducing the magnitude of the forces experienced by the plunger is believed to help improve the useful life of plungers made of ceramics or other similar materials. Plunger assembly 43 is believed to accomplish this reduction by temporarily storing energy when the forces applied to plunger 80 are the greatest and then releasing that energy at a later time when the forces acting on plunger 80 are less.

In operation, tappet assembly 36 and plunger assembly 43 move upward (during a pumping cycle) when a lobe 56 of camshaft 34 rotates to a point where it is underneath tappet assembly 36. In this position, lobe 56 applies a force to tappet assembly 36, which then applies that force directly to plunger assembly 43, in particular, to end 86 of plunger 80. This application of force, which overcomes the biasing force provided by spring 40, is generally not problematic with respect to the use of ceramic plungers because the stress experienced by plunger 80 is a compressive stress, which ceramics are able to withstand relatively well. When tappet assembly 36 and plunger assembly 43 reach top dead center, the highest point of lobe 56 will be under tappet assembly 36. As camshaft 34 continues to turn, tappet assembly 36 will start to roll down the backside of cam lobe 56. At that point in time, camshaft 34 will stop applying any upward force to tappet assembly 36 and plunger assembly 43. Without the force applied by camshaft 34, the force provided by spring 40 (which is fully compressed at this point) to retainer 104 will urge plunger assembly 43 and tappet assembly 36 back toward bottom dead center. This is the point in the cycle that is normally problematic with respect to previous attempts to retain ceramic plungers because this is where the greatest return force is applied to the plunger (due to the full compression of spring 40) and because the force is normally applied to the ceramic plunger at a location other than an end of the plunger. Consequently, this is the point in the cycle at which the ceramic plunger is exposed to the greatest tensile stresses.

The downward force applied by spring 40 is applied directly to flange 124 of retainer 104, which is then transferred to body portion 122 of retainer 104. As previously described, first region 128 of body portion 122 receives plunger 80, but is not large enough to receive retention ring 100. Second region 130 of body portion 122, on the other hand, receives retention ring 100 in a chamber defined by transition region 132 and inner surface 134 of second region 130. Thus, as retainer 104 is forced downward by spring 40, retention ring 100 is also forced downward because it is unable to pass beyond transition region 132 of retainer 104. Specifically, transition region 132 of retainer 104 contacts bead 106 of retention ring 100 and applies a force to bead 106. Due to the orientation of transition region 132, a force is applied to bead 106 that has an axial component that urges bead 106 downward and a radial component that urges bead 106 radially inward. Transition region 132 may be designed to provide a force to bead 106 that has a proportion between its axial force component and its radial force component that is appropriate for the particular application. Because bead 106 is located within groove 88 of plunger 80, bead 106 is not able to move inward. Bead 106 is, however, able to move downward within groove 88 as illustrated in FIG. 4. But due to the configuration of bead 106 and groove 88, the only way for bead 106 to move downward is either to force plunger 80 downward so that groove 88 moves along with bead 106 or to move both outward and downward, relative to plunger 80, within groove 88. In order for bead 106 to move outward, the two halves of retention ring 100 must move apart from one another. This movement of the two halves of retention ring 100 apart from one another is done against the bias provided by resilient member 102 and acts to expand resilient member 102 as illustrated in FIG. 4. The expansion of resilient member 102 (which acts as a type of spring) against the bias it provides serves to store energy within resilient member 102. The energy stored within resilient member 102 is then released at a later time, either as plunger 80 moves downward toward bottom dead center or at the beginning of the subsequent pumping cycle. To ensure that bead 106 stays within groove 88, the extent to which the two halves of retention ring 100 may expand is limited by 1) the radial gap 200 between outer surface 120 of resilient member 102 and inner surface 134 of second region 130 of retainer 104, and/or 2) the radial gap 201 between outer surface 112 of bead 106 and inner surface 134 of second region 130 of retainer 104. The size of the radial gap may be adjusted such that it is suitable for the particular application and circumstances.

The magnitude of the force generated by spring 40 is the greatest when plunger assembly 43 is at top dead center because that is the point at which spring 40 is fully compressed. Thus, the magnitude of the force or stress ultimately applied to plunger 80 is the greatest when plunger 80 is at or near top dead center. By storing energy within resilient member 102 at this point, the peak force that acts upon plunger 80 at any one time can be reduced. The reduction of the peak force or stress is believed to increase the life of the plunger.

Depending upon the configuration and application of the pump, plunger assembly 43 may be tuned or adjusted to operate most effectively. According to one exemplary embodiment, plunger assembly 43 may be tuned such that bead 106 moves within groove 88 and expands resilient member 102 only when plunger 80 would otherwise be subjected to forces that are large enough to damage plunger 80. Characteristics such as pump speed, the desired pressure and flow rates of the pump, the size of the pump, the number of cylinders or pumping chambers of the pump, and/or other potential characteristic may all affect how plunger assembly 43 should be tuned or adjusted. To tune the plunger assembly, factors such as the size and shape of groove 88, the size and shape of bead 106, the material from which resilient member 102 is made, the thickness and width of resilient member 102, size of the gap 200 or gap G', the configuration and orientation of transition region 132 of the retainer 104, the configuration of camshaft 34, and other potential factors may be adjusted.

It is important to note that the construction and arrangement of the elements of the retention system as shown in the exemplary and other alternative embodiments is illustrative only. Although only a few embodiments of the retention system have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, orientations, etc.) without materially departing from the novel teachings and advantages of the subject matter recited. For example, elements shown as integrally formed may be constructed of multiple parts or elements shown as multiple parts may be integrally formed, the operation of the interfaces (e.g., the groove and bead, etc.) may be reversed or otherwise varied, and/or the length or width of the structures and/or members or connectors or other elements of the system may be varied. It should be noted that the elements and/or assemblies of the retention system may be constructed from any of a wide variety of materials that provide sufficient strength, durability, and other relevant characteristics, from any of a wide variety of different manufacturing processes, and in any of a wide variety of colors, textures and combinations. It should also be noted that the retention system may be used in association with various types of pumps, including a variety of different piston pumps, or with a variety of different mechanisms in a variety of different applications (e.g., various mechanisms in engines, such as intake or exhaust valves, hydraulic cylinders, fuel injectors, etc.). Accordingly, all such modifications are intended to be included within the scope of the present inventions. Other substitutions, modifications, changes and omissions may be made in the design, operating conditions and arrangement of the exemplary and other alternative embodiments without departing from the spirit of the present inventions.

What is claimed is:

1. A retention system comprising:
    a first element having a longitudinal axis and including an engagement structure;
    a retention ring divided into at least two pieces and located around at least a portion of the first element, wherein at least one portion of the retention ring engages the engagement structure of the first element;
    a resilient member coupled to, and in contact with, the retention ring and configured to resiliently bias each of the at least two pieces of the retention ring toward the first element; and
    a retainer coupled around, and in contact with, the at least one portion of the retention ring, and being coupled around at least a portion of the resilient member, the retainer having an inner surface that is spaced apart from an outer surface of at least one of the retention ring and the resilient member by a gap;
    wherein the first element, the retention ring, the resilient member, and the retainer are configured so that the retention ring is moveable in an axial direction relative to the first element and so that the movement of the retention ring relative to the first element acts to expand the resilient member against the bias provided by the resilient member.

2. The retention system of claim 1, wherein the engagement structure is an annular groove around the outer periphery of the first element and wherein the at least one portion of the retention ring extends into the annular groove.

3. The retention system of claim 2, wherein at least one of two edges of the annular groove is radiused.

4. The retention system of claim 2, wherein the retention ring includes a radially inwardly extending annular bead and a cylindrical skirt extending axially from the radially inwardly extending annular bead toward a tappet end of the first element, wherein the radially inwardly extending annular bead defines the at least one portion of the retention ring and at least a portion of the radially inwardly extending annular bead extends into the annular groove of the first element; and
    the cylindrical skirt having an axial length that is greater than the radially inward extending annular bead.

5. The retention system of claim 4 wherein the resilient member is coupled to the retention ring around an outer periphery of the cylindrical skirt.

6. The retention system of claim 4, wherein the shape of the radially inward extending annular bead substantially corresponds to the shape of the annular groove.

7. The retention system of claim 6, wherein the profile of the annular groove and the portion of the radially inward extending annular bead that engages the groove are in the shape of an arc.

8. The retention system of claim 7, wherein the profile of the annular groove and the portion of the radially inward extending annular bead that engages the annular groove are substantially semi-circular.

9. The retention system of claim 1, wherein the first element is a plunger for a pump.

10. The retention system of claim 9, wherein the plunger is constructed from a ceramic material.

11. The retention system of claim 10, wherein the ceramic material is $ZrO_2$.

12. The retention system of claim 4, wherein the first element, the retention ring, the resilient member, and the retainer are configured so that when the retention ring moves axially relative to the first element, the at least two pieces of the retention ring move radially outward.

13. The retention system of claim 12, wherein the size of the gap between the inner surface of the retainer and the outer surface of at least one of the retention ring and the resilient member limits the extent to which the retention ring is able to move relative to the first element.

14. The retention system of claim 13, wherein the gap is sized to prevent the radially inwardly extending annular bead that extends into the annular groove of the first element from becoming disengaged with the annular groove.

15. The retention system of claim 1, wherein the retainer includes a transition region configured to contact the retention ring.

16. The retention system of claim 15, wherein the transition region is angled relative to the longitudinal axis of the first element such that the retainer urges the retention ring toward the first element when the retainer contacts the retention ring.

17. The retention system of claim 1, wherein the retention ring is divided into two halves, the two halves being arranged on opposing sides of the first element.

18. A method of retaining a first element within a second element comprising the steps of:
    providing a first engagement structure, which includes an annular groove, on the first element;
    providing a second engagement structure, which includes a tube-like skirt extending in an axial direction from a radially inwardly extending annular bead, on the second element, the radially inwardly extending annular bead of the second engagement structure being configured to engage the annular groove of the first engagement structure, and the second engagement structure being configured to move relative to the first engagement structure;

maintaining the radially inwardly extending annular bead in the annular groove by surrounding the tube-like skirt with a resilient member;

storing energy within the resilient member when the second engagement structure moves relative to the first engagement structure in the axial direction; and releasing the stored energy after the second engagement structure moves relative to the first engagement structure.

19. The method of claim 18, further comprising the step of limiting the extent to which the second engagement structure is able to move relative to the first engagement structure by limiting how far the resilient member can expand.

20. The method of claim 19, wherein the first element is a plunger for a pump.

21. The method of claim 20, wherein the plunger is made from a ceramic material.

22. A fuel pump comprising:
a head defining a chamber;
a control valve fluidly coupled to the chamber and configured to at least partially control the flow of fuel into and out of the chamber;
a driven member;
a ceramic plunger assembly engaging the driven member and configured to reciprocate linearly in response to the driven member, the plunger assembly comprising:
a generally cylindrical plunger having a longitudinal axis and including an annular groove around its outer periphery, the plunger being configured to be received by and reciprocate within chamber;
a retention ring divided into at least two pieces and placed around the plunger, wherein at least one portion of the retention ring extends into the groove of the plunger;
a resilient member coupled around, and in contact with the retention ring and configured to resiliently bias each of the at least two pieces of the retention ring toward the plunger; and
a retainer coupled around, and in contact with the at least one portion of the retention ring, and being coupled around at least a portion of the resilient member, the retainer having an inner surface that is spaced apart from an outer surface of at least one of the retention ring and the resilient member by a gap;
wherein the ceramic plunger, the retention ring, the resilient member, and the retainer are configured so that the retention ring is moveable in an axial direction relative to the ceramic plunger and so that the movement of the retention ring relative to the ceramic plunger acts to expand the resilient member against the bias provided by the resilient member.

* * * * *